United States Patent
Yan et al.

(10) Patent No.: US 9,985,755 B2
(45) Date of Patent: May 29, 2018

(54) DATA TRANSMISSION METHOD, APPARATUS, AND DEVICE

(71) Applicant: HUAWEI TECHNOLOGIES CO., LTD., Shenzhen (CN)

(72) Inventors: Zhiyu Yan, Beijing (CN); Sha Ma, Beijing (CN); Yuan Xia, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 62 days.

(21) Appl. No.: 15/098,798

(22) Filed: Apr. 14, 2016

(65) Prior Publication Data
US 2016/0233990 A1 Aug. 11, 2016

Related U.S. Application Data

(63) Continuation of application No. PCT/CN2013/085342, filed on Oct. 16, 2013.

(51) Int. Cl.
*H04L 1/18* (2006.01)
*H04L 1/08* (2006.01)
(Continued)

(52) U.S. Cl.
CPC .............. *H04L 1/1896* (2013.01); *H04L 1/08* (2013.01); *H04L 1/1628* (2013.01); *H04L 1/189* (2013.01);
(Continued)

(58) Field of Classification Search
CPC ....... H04L 1/1896; H04L 1/08; H04L 1/1858; H04L 1/189; H04L 1/1628; H04L 1/1812; H04L 1/1854; H04L 2001/125
(Continued)

(56) References Cited

U.S. PATENT DOCUMENTS 8,270,348 B2* 9/2012 Chun ................ H04L 1/1628
370/328
8,392,784 B2* 3/2013 Kuo ................. H04L 1/1887
714/749
(Continued)

FOREIGN PATENT DOCUMENTS

CN 101197640 A 6/2008
CN 102292927 A 12/2011
(Continued)

OTHER PUBLICATIONS

International Search Report dated Jul. 23, 2014, in corresponding International Application No. PCT/CN2013/085342.
(Continued)

*Primary Examiner* — John J Tabone, Jr.
(74) *Attorney, Agent, or Firm* — Staas & Halsey LLP

(57) ABSTRACT

Embodiments of the present invention provide a data transmission method, apparatus, and device. The method includes: receiving a $P^{th}$ piece of hybrid automatic repeat request HARQ process data sent by a data transmit end at an $N^{th}$ moment, where P is a positive integer greater than or equal to 1, and N is a positive integer greater than or equal to 1; and sending Q pieces of hybrid automatic repeat request-acknowledgment HARQ-ACK information to the data transmit end at an $M^{th}$ moment, where the HARQ-ACK information corresponding to the Q pieces of HARQ process data is feedbacks corresponding to Q pieces of HARQ process data whose HARQ-ACK information is not received by the data transmit end before the $M^{th}$ moment, Q pieces of HARQ-ACK information include a $P^{th}$ piece of HARQ-ACK information corresponding to the $P^{th}$ piece of HARQ process data, and M is a positive integer greater than N.

18 Claims, 4 Drawing Sheets

Receive a $P^{th}$ piece of hybrid automatic repeat request process data sent by a data transmit end at an $N^{th}$ moment, where P is a positive integer greater than or equal to 1, and N is a positive integer greater than or equal to 1 — S101

Send, to the data transmit end at an $M^{th}$ moment, Q pieces of hybrid automatic repeat request feedback information, where the Q pieces of hybrid automatic repeat request feedback information are feedbacks corresponding to Q pieces of hybrid automatic repeat request process data whose hybrid automatic repeat request feedback information is not received before the $M^{th}$ moment, the Q pieces of hybrid automatic repeat request feedback information include a $P^{th}$ piece of hybrid automatic repeat request feedback information corresponding to the $P^{th}$ piece of hybrid automatic repeat request process data, and M is a positive integer greater than N — S102

(51) Int. Cl.
*H04L 1/16* (2006.01)
*H04L 1/12* (2006.01)

(52) U.S. Cl.
CPC .......... *H04L 1/1812* (2013.01); *H04L 1/1854* (2013.01); *H04L 1/1858* (2013.01); *H04L 2001/125* (2013.01)

(58) Field of Classification Search
USPC ................................ 714/750, 749, 748, 712
See application file for complete search history.

(56) References Cited

U.S. PATENT DOCUMENTS

| | | | | | |
|---|---|---|---|---|---|
| 8,473,825 | B2* | 6/2013 | Burbidge | ............. | H04L 1/1621 714/752 |
| 8,660,068 | B2* | 2/2014 | Chun | ............. | H04L 1/1628 370/328 |
| 8,711,780 | B2* | 4/2014 | Chun | ............. | H04L 1/1628 370/328 |
| 8,824,376 | B2* | 9/2014 | Chun | ............. | H04L 1/1628 370/328 |
| 8,929,282 | B2* | 1/2015 | Wu | ............. | H04L 1/1812 370/328 |
| 9,735,924 | B2* | 8/2017 | Chen | ............. | H04L 1/0073 |
| 2009/0203374 | A1* | 8/2009 | Chun | ............. | H04L 1/1628 455/425 |
| 2009/0204862 | A1* | 8/2009 | Chun | ............. | H04L 1/1822 714/748 |
| 2009/0235139 | A1* | 9/2009 | Park | ............. | H04L 1/1819 714/750 |
| 2009/0327830 | A1* | 12/2009 | Lee | ............. | H04L 1/1887 714/749 |
| 2010/0042888 | A1* | 2/2010 | Kuo | ............. | H04L 1/1887 714/749 |
| 2010/0070816 | A1* | 3/2010 | Park | ............. | H04L 1/1835 714/748 |
| 2010/0275086 | A1* | 10/2010 | Bergquist | ............. | H04L 1/1812 714/748 |
| 2011/0099447 | A1* | 4/2011 | Park | ............. | H04L 1/1812 714/748 |
| 2011/0239076 | A1* | 9/2011 | Liu | ............. | H03M 13/6306 714/751 |
| 2011/0268048 | A1* | 11/2011 | Toskala | ............. | H04L 1/16 370/329 |
| 2012/0026912 | A1* | 2/2012 | Liu | ............. | H04L 1/0007 370/252 |
| 2012/0079336 | A1 | 3/2012 | Bergman | | |
| 2013/0242931 | A1* | 9/2013 | Bi | ............. | H04L 1/1854 370/329 |
| 2014/0040694 | A1* | 2/2014 | Verma | ............. | H04L 1/1812 714/748 |
| 2014/0245095 | A1* | 8/2014 | Nammi | ............. | H04L 1/1845 714/749 |
| 2015/0009972 | A1* | 1/2015 | Xu | ............. | H04L 1/1854 370/336 |
| 2015/0327294 | A1* | 11/2015 | Chen | ............. | H04L 1/1812 370/329 |

FOREIGN PATENT DOCUMENTS

| | | |
|---|---|---|
| CN | 102480347 A | 5/2012 |
| CN | 102292927 B | 9/2013 |
| EP | 0 825 738 A2 | 2/1998 |
| EP | 2 086 148 A2 | 8/2009 |
| WO | 2009/099369 A1 | 8/2009 |
| WO | WO 2010/094148 A1 | 8/2010 |
| WO | 2012/040720 A1 | 3/2012 |

OTHER PUBLICATIONS

International Search Report dated Jul. 23, 2014 in corresponding International Patent Application No. PCT/CN2013/085342.
Extended European Search Report dated Oct. 4, 2016 in corresponding European Patent Application No. 13895488.8.
Chinese Office Action dated Dec. 5, 2017 in related Chinese Patent Application No. 201380002349.2.

* cited by examiner

DATA TRANSMISSION METHOD, APPARATUS, AND DEVICE

CROSS REFERENCE

This application is a continuation of International Application No. PCT/CN2013/085342, filed on Oct. 16, 2013, which is hereby incorporated by reference in its entirety.

TECHNICAL FIELD

Embodiments of the present invention relate to the field of communications technologies, and in particular, to a data transmission method, apparatus, and device.

BACKGROUND

A stop and wait mode is generally used in hybrid automatic repeat request (Hybrid Automatic Repeat Request, HARQ for short hereinafter), that is, every time a transmit end sends a data packet, the transmit end temporarily stops and waits for acknowledgement information from a receive end. When the data packet reaches the receive end, the receive end performs error detection on the data packet, and if the received data packet is correct, returns an acknowledgement (Acknowledgment, ACK for short hereinafter) signal, or if the received data packet is incorrect, returns a negative acknowledgement (Negative Acknowledgement, NACK for short hereinafter) signal. When receiving the ACK signal, the transmit end sends new data, or otherwise resends the previously transmitted data packet. Therefore, an HARQ process is a process from data transmission to an ACK feedback or a NACK feedback of data. A Long Term Evolution (Long Term Evolution, LTE for short hereinafter) system uses a stop and wait protocol of eight processes, that is, the transmit end concurrently runs eight different stop and wait processes on a channel, and the data transmit end sends a data block of another HARQ process to the data receive end before receiving a feedback message of a previous HARQ process. In addition, a time sequence relationship between a sending moment when the data transmit end sends one piece of HARQ process data and a moment when the data transmit end receives an HARQ-ACK feedback of the process data is preset. That is, after receiving an HARQ-ACK feedback of one HARQ process, the data transmit end may determine, according to a preset time sequence relationship between a transmission moment of the process data and a receiving moment of the HARQ-ACK feedback, an HARQ process for which the HARQ-ACK feedback is provided.

To obtain larger transmission bandwidth, a carrier aggregation technology is introduced into the LTE system. For carrier aggregation between base stations, because data scheduling of multiple downlink carriers that belong to different base stations is independently performed due to non ideal reverberation (Non Ideal Reverberation) between the base stations, when working in a carrier aggregation system between the base stations, user equipment (User Equipment, UE for short hereinafter) needs to separately send an HARQ-ACK feedback for downlink data transmission of multiple base stations and cannot use a manner in which HARQ-ACK feedbacks of the multiple base stations are sent to one base station in a case of ideal reverberation (Ideal Reverberation). However, there may be a type of UE of a low capability, where uplink sending of the type of UE cannot be operated on carriers corresponding to multiple evolved NodeBs (evolved NodeB, eNB for short hereinafter) at the same time, and can only be operated on an uplink carrier corresponding to one eNB at every moment. When working in a CA system between the foregoing eNBs, the type of UE can only use a time division manner to transmit uplink data to the multiple base stations, so that the multiple base stations all learn an HARQ-ACK feedback status of their respective downlink data transmission.

However, because a time sequence relationship between a sending moment when a data transmit end sends one piece of HARQ process data and a moment when the data transmit end receives an HARQ-ACK feedback of the process data is preset, to comply with the preset time sequence relationship, a data receive end feeds back an HARQ-ACK to multiple base stations in the time division manner, so that scheduling of downlink carriers by the base stations at a moment also satisfies a corresponding time division manner. Therefore, a frequency spectrum resource of a carrier aggregation system cannot be fully used, which leads to a limited peak transmission rate of a user.

SUMMARY

Embodiments of the present invention provide a data transmission method, apparatus, and device, so that a frequency spectrum resource of a carrier aggregation system between base stations can be fully used, which improves a peak transmission rate of a user.

A first aspect of an embodiment of the present invention provides a data transmission method, including:

receiving a $P^{th}$ piece of hybrid automatic repeat request HARQ process data sent by a data transmit end at an $N^{th}$ moment, where P is a positive integer greater than or equal to 1, and N is a positive integer greater than or equal to 1; and sending, to the data transmit end at an $M^{th}$ moment, hybrid automatic repeat request-acknowledgment HARQ-ACK information corresponding to Q pieces of HARQ process data, where the HARQ-ACK information corresponding to the Q pieces of HARQ process data is a feedback corresponding to HARQ process data whose HARQ-ACK information is not sent to the data transmit end before the $M^{th}$ moment, the HARQ-ACK information corresponding to the Q pieces of HARQ process data includes a $P^{th}$ piece of HARQ-ACK information corresponding to the $P^{th}$ piece of HARQ process data, and M is a positive integer greater than N.

With reference to the first aspect, in a first possible implementation manner of the first aspect, before the sending, to the data transmit end at an $M^{th}$ moment, HARQ-ACK information corresponding to Q pieces of HARQ process data, the method further includes:

receiving an HARQ-ACK information transmission resource set configured by the data transmit end for all HARQ process data, where each piece of HARQ process data corresponds to one HARQ-ACK information transmission resource; and the sending, to the data transmit end at an $M^{th}$ moment, HARQ-ACK information corresponding to Q pieces of HARQ process data includes:

sending, to the data transmit end, the HARQ-ACK information corresponding to the Q pieces of HARQ process data at the $M^{th}$ moment and on Q HARQ-ACK information transmission resources corresponding to the Q pieces of HARQ process data.

With reference to the first aspect or the first possible implementation manner of the first aspect, in a second possible implementation manner of the first aspect, the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; the sending, to the data transmit end at an $M^{th}$ moment, HARQ-ACK information corresponding to the Q pieces of HARQ process data includes:

sending, to the data transmit end, the HARQ-ACK information corresponding to the Q pieces of HARQ process data within sending time corresponding to the $P^{th}$ HARQ-ACK information detection window, where the $M^{th}$ moment is a preset sending moment within the sending time corresponding to the $P^{th}$ HARQ-ACK information detection window.

With reference to the second possible implementation manner of the first aspect, in a third possible implementation manner of the first aspect, a start moment of the $P^{th}$ HARQ-ACK information detection window is a moment when the data transmit end starts to perform detection on the $P^{th}$ piece of HARQ-ACK information.

A second aspect of an embodiment of the present invention provides a data transmission method, including:

sending a $P^{th}$ piece of HARQ process data to a data receive end at an $N^{th}$ moment, where P is a positive integer greater than or equal to 1, and N is a positive integer greater than or equal to 1; and receiving hybrid automatic repeat request-acknowledgment HARQ-ACK information that is sent by the data receive end at an $M^{th}$ moment and that corresponds to Q pieces of HARQ process data, where the HARQ-ACK information corresponding to the Q pieces of HARQ process data is an HARQ-ACK feedback corresponding to HARQ process data whose HARQ-ACK information is not sent by the data receive end to a data transmit end before the $M^{th}$ moment, the HARQ-ACK information corresponding to the Q pieces of HARQ process data includes a $P^{th}$ piece of HARQ-ACK information corresponding to the $P^{th}$ piece of HARQ process data, and M is a positive integer greater than N.

With reference to the second aspect, in a first possible implementation manner of the second aspect, before the receiving HARQ-ACK information that is sent by the data receive end at an $M^{th}$ moment and that corresponds to Q pieces of HARQ process data, the method further includes:

configuring, for the data receive end, an HARQ-ACK information transmission resource set corresponding to all HARQ process data, where each piece of HARQ process data corresponds to one HARQ-ACK information transmission resource; and sending, to the data receive end, information used to indicate the HARQ-ACK information transmission resource set, where the receiving HARQ-ACK information that is sent by the data receive end at an $M^{th}$ moment and that corresponds to Q pieces of HARQ process data includes:

receiving Q pieces of HARQ-ACK information that are sent by the data receive end at the $M^{th}$ moment and on Q HARQ-ACK information transmission resources corresponding to the Q pieces of HARQ process data and that correspond to the Q pieces of HARQ process data.

With reference to the second aspect or the first possible implementation manner of the second aspect, in a second possible implementation manner of the second aspect, after the sending a $P^{th}$ piece of HARQ process data to a data receive end at an $N^{th}$ moment, the method further includes:

performing detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

With reference to the second possible implementation manner of the second aspect, in a third possible implementation manner of the second aspect, the performing detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data includes:

if the $P^{th}$ piece of HARQ-ACK information corresponding to the $P^{th}$ piece of HARQ process data is detected, determining an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determining that the $P^{th}$ piece of HARQ process data fails to be sent.

With reference to the third possible implementation manner of the second aspect, in a fourth possible implementation manner of the second aspect, a start moment of the $P^{th}$ HARQ-ACK information detection window is a start moment for performing detection on the $P^{th}$ piece of HARQ-ACK information.

A third aspect of an embodiment of the present invention provides a data transmission apparatus, including:

a receiving module, configured to receive a $P^{th}$ piece of hybrid automatic repeat request HARQ process data sent by a data transmit end at an $N^{th}$ moment, where P is a positive integer greater than or equal to 1, and N is a positive integer greater than or equal to 1; and a sending module, configured to send, to the data transmit end at an $M^{th}$ moment, hybrid automatic repeat request-acknowledgment HARQ-ACK information corresponding to Q pieces of HARQ process data, where the HARQ-ACK information corresponding to the Q pieces of HARQ process data is a feedback corresponding to HARQ process data whose HARQ-ACK information is not sent to the data transmit end before the $M^{th}$ moment, the HARQ-ACK information corresponding to the Q pieces of HARQ process data includes a $P^{th}$ piece of HARQ-ACK information corresponding to the $P^{th}$ piece of HARQ process data, and M is a positive integer greater than N.

With reference to the third aspect, in a first possible implementation manner of the third aspect, the receiving module is further configured to: before the sending module sends the HARQ-ACK information corresponding to the Q pieces of HARQ process data to the data transmit end at the $M^{th}$ moment, receive an HARQ-ACK information transmission resource set configured by the data transmit end for all HARQ process data, where each piece of HARQ process data corresponds to one HARQ-ACK information transmission resource; and the sending module is specifically configured to send, to the data transmit end, the HARQ-ACK information corresponding to the Q pieces of HARQ process data at the $M^{th}$ moment and on Q HARQ-ACK information transmission resources corresponding to the Q pieces of HARQ process data.

With reference to the third aspect or the first possible implementation manner of the third aspect, in a second possible implementation manner of the third aspect, the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; the sending module is specifically configured to send, to the data transmit end, the HARQ-ACK information corresponding to the Q pieces of HARQ process data within sending time corresponding to the $P^{th}$ HARQ-ACK information detection window, where the $M^{th}$ moment is a preset sending moment within the sending time corresponding to the $P^{th}$ HARQ-ACK information detection window.

With reference to the second possible implementation manner of the third aspect, in a third possible implementation manner of the third aspect, a start moment of the $P^{th}$ HARQ-ACK information detection window is a moment when the data transmit end starts to perform detection on the $P^{th}$ piece of HARQ-ACK information.

A fourth aspect of an embodiment of the present invention provides a data transmission apparatus, including:

a sending module, configured to send a $P^{th}$ piece of hybrid automatic repeat request HARQ process data to a data receive end at an $N^{th}$ moment, where P is a positive integer greater than or equal to 1, and N is a positive integer greater than or equal to 1; and a receiving module, configured to receive hybrid automatic repeat request-acknowledgment HARQ-ACK information that is sent by the data receive end at an $M^{th}$ moment and that corresponds to Q pieces of HARQ process data, where the HARQ-ACK information corresponding to the Q pieces of HARQ process data is an HARQ-ACK feedback corresponding to HARQ process data whose HARQ-ACK information is not sent by the data receive end to a data transmit end before the $M^{th}$ moment, the HARQ-ACK information corresponding to the Q pieces of HARQ process data includes a $P^{th}$ piece of HARQ-ACK information corresponding to the $P^{th}$ piece of HARQ process data, and M is a positive integer greater than N.

With reference to the fourth aspect, in a first possible implementation manner of the fourth aspect, the apparatus further includes:

a configuring module, configured to: before the receiving module receives the HARQ-ACK information that is sent by the data receive end at the $M^{th}$ moment and that corresponds to the Q pieces of HARQ process data, configure, for the data receive end, an HARQ-ACK information transmission resource set corresponding to all HARQ process data, where each piece of HARQ process data corresponds to one HARQ-ACK information transmission resource;

the sending module is further configured to send, to the data receive end, information used to indicate the HARQ-ACK information transmission resource set; and the receiving module is specifically configured to receive Q pieces of HARQ-ACK information that are sent by the data receive end at the $M^{th}$ moment and on Q HARQ-ACK information transmission resources corresponding to the Q pieces of HARQ process data and that correspond to the Q pieces of HARQ process data.

With reference to the fourth aspect or the first possible implementation manner of the fourth aspect, in a second possible implementation manner of the fourth aspect, the apparatus further includes:

a detecting module, configured to: after the sending module sends the $P^{th}$ piece of HARQ process data to the data receive end at the Nth moment, perform detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

With reference to the second possible implementation manner of the fourth aspect, in a third possible implementation manner of the fourth aspect, the detecting module is specifically configured to: if the $P^{th}$ piece of HARQ-ACK information corresponding to the $P^{th}$ piece of HARQ process data is detected, determine an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determine that the $P^{th}$ piece of HARQ process data fails to be sent.

With reference to the third possible implementation manner of the fourth aspect, in a fourth possible implementation manner of the fourth aspect, a start moment of the $P^{th}$ HARQ-ACK information detection window is a start moment for performing detection on the $P^{th}$ piece of HARQ-ACK information.

A fifth aspect of an embodiment of the present invention provides a data transmission device, including:

a receiver, configured to receive a $P^{th}$ piece of hybrid automatic repeat request HARQ process data sent by a data transmit end at an $N^{th}$ moment, where P is a positive integer greater than or equal to 1, and N is a positive integer greater than or equal to 1; and a transmitter, configured to send, to the data transmit end at an $M^{th}$ moment, hybrid automatic repeat request-acknowledgment HARQ-ACK information corresponding to Q pieces of HARQ process data, where the HARQ-ACK information corresponding to the Q pieces of HARQ process data is a feedback corresponding to HARQ process data whose HARQ-ACK information is not sent to the data transmit end before the $M^{th}$ moment, the HARQ-ACK information corresponding to the Q pieces of HARQ process data includes a $P^{th}$ piece of HARQ-ACK information corresponding to the $P^{th}$ piece of HARQ process data, and M is a positive integer greater than N.

With reference to the fifth aspect, in a first possible implementation manner of the fifth aspect, the receiver is further configured to: before the transmitter sends, to the data transmit end at the $M^{th}$ moment, the HARQ-ACK information corresponding to the Q pieces of HARQ process data, receive an HARQ-ACK information transmission resource set configured by the data transmit end for all HARQ process data, where each piece of HARQ process data corresponds to one HARQ-ACK information transmission resource; and the transmitter is specifically configured to send, to the data transmit end, the HARQ-ACK information corresponding to the Q pieces of HARQ process data at the $M^{th}$ moment and on Q HARQ-ACK information transmission resources corresponding to the Q pieces of HARQ process data.

With reference to the fifth aspect or the first possible implementation manner of the fifth aspect, in a second possible implementation manner of the fifth aspect, the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; then, the transmitter is specifically configured to send, to the data transmit end, the HARQ-ACK information corresponding to the Q pieces of HARQ process data within sending time corresponding to the $P^{th}$ HARQ-ACK information detection window, where the $M^{th}$ moment is a preset sending moment within the sending time corresponding to the $P^{th}$ HARQ-ACK information detection window.

With reference to the second possible implementation manner of the fifth aspect, in a third possible implementation manner of the fifth aspect, a start moment of the $P^{th}$ HARQ-ACK information detection window is a moment when the data transmit end starts to perform detection on the $P^{th}$ piece of HARQ-ACK information.

A sixth aspect of an embodiment of the present invention provides a data transmission device, including:

a transmitter, configured to send a $P^{th}$ piece of hybrid automatic repeat request HARQ process data to a data receive end at an $N^{th}$ moment, where P is a positive integer greater than or equal to 1, and N is a positive integer greater than or equal to 1; and a receiver, configured to receive hybrid automatic repeat request-acknowledgment HARQ-ACK information that is sent by the data receive end at an $M^{th}$ moment and that corresponds to Q pieces of HARQ process data, where the HARQ-ACK information corresponding to the Q pieces of HARQ process data is an HARQ-ACK feedback corresponding to HARQ process data whose HARQ-ACK information is not sent by the data receive end to a data transmit end before the Mth moment, the HARQ-ACK information corresponding to the Q pieces of HARQ process data includes a $P^{th}$ piece of HARQ-ACK information corresponding to the Pth piece of HARQ process data, and M is a positive integer greater than N.

With reference to the sixth aspect, in a first possible implementation manner of the sixth aspect, the device further includes:

a processor, configured to: before the receiver receives the HARQ-ACK information that is sent by the data receive end at the $M^{th}$ moment and that corresponds to the Q pieces of HARQ process data, configure, for the data receive end, an HARQ-ACK information transmission resource set corresponding to all HARQ process data, where each piece of HARQ process data corresponds to one HARQ-ACK information transmission resource;

the transmitter is further configured to send, to the data receive end, information used to indicate the HARQ-ACK information transmission resource set; and the receiver is specifically configured to receive Q pieces of HARQ-ACK information that are sent by the data receive end at the $M^{th}$ moment and on Q HARQ-ACK information transmission resources corresponding to the Q pieces of HARQ process data and that correspond to the Q pieces of HARQ process data.

With reference to the sixth aspect or the first possible implementation manner of the sixth aspect, in a second possible implementation manner of the sixth aspect, the processor is further configured to: after the transmitter sends the $P^{th}$ piece of HARQ process data to the data receive end at the $N^{th}$ moment, perform detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

With reference to the second possible implementation manner of the sixth aspect, in a third possible implementation manner of the sixth aspect, the processor is specifically configured to: if the $P^{th}$ piece of HARQ-ACK information corresponding to the $P^{th}$ piece of HARQ process data is detected, determine an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determine that the $P^{th}$ piece of HARQ process data fails to be sent.

With reference to the third possible implementation manner of the sixth aspect, in a fourth possible implementation manner of the sixth aspect, a start moment of the $P^{th}$ HARQ-ACK information detection window is a start moment for performing detection on the $P^{th}$ piece of HARQ-ACK information.

According to the data transmission method, apparatus, and device provided in the embodiments of the present invention, a data receive end receives a $P^{th}$ piece of HARQ process data sent by a data transmit end at an $N^{th}$ moment, the data receive end sends, at an $M^{th}$ moment, HARQ-ACK information corresponding to Q pieces of HARQ process data that includes a $P^{th}$ piece of HARQ-ACK information corresponding to the $P^{th}$ piece of HARQ process data, and the HARQ-ACK information corresponding to the Q pieces of HARQ process data is HARQ-ACK feedbacks corresponding to some or all HARQ process data in HARQ process data whose HARQ-ACK information is not fed back to the data transmit end before the $M^{th}$ moment. Therefore, when the data receive end feeds back an HARQ-ACK to multiple base stations in a time division manner in a case of non ideal reverberation between base stations, the data transmit end may send HARQ process data to the data receive end in multiple downlink carriers at the same time (that is, downlink data scheduling by the data transmit end for the data receive end is not limited), so that a frequency spectrum resource of a carrier aggregation system can be fully used, which improves a peak transmission rate of a user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
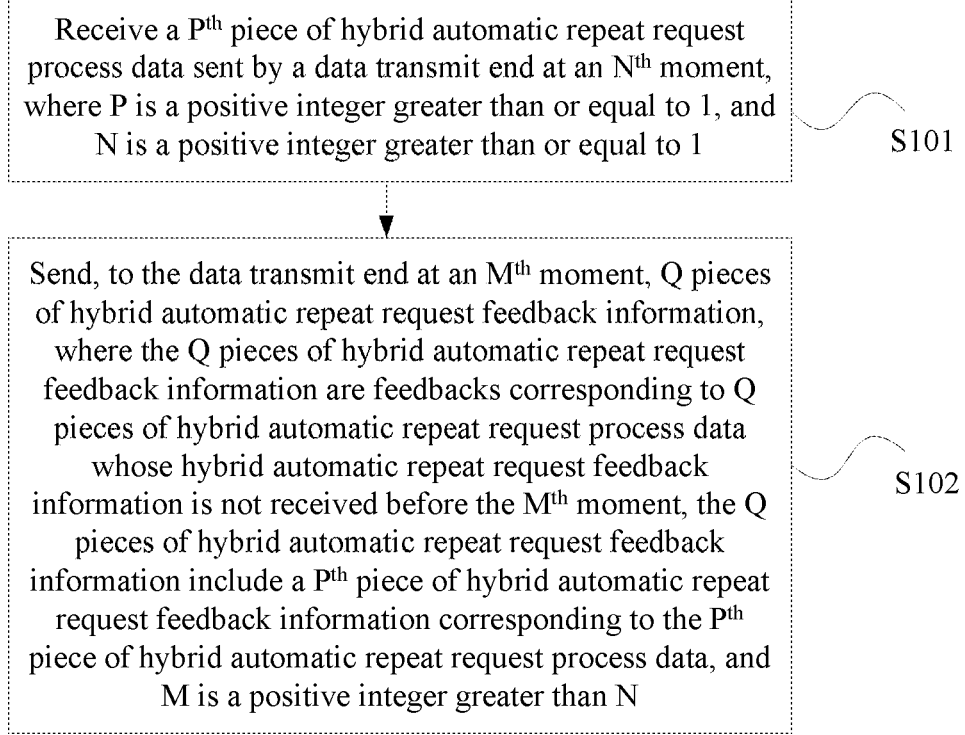
FIG. 1 is a schematic flowchart of a data transmission method according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A data transmit end in the embodiments of the present invention may be a base station, or may be another data transceiver device; a data receive end may be UE, or may be another transceiver device, which is not limited in the embodiments of the present invention.

To make a scenario that is applicable to a method in the embodiments of the present invention clear, the scenario applicable to the embodiments of the present invention is briefly described herein. It should be noted that the UE is used as an example for all data receive ends herein, and the base station is used as an example for all data transmit ends. However, the embodiments of the present invention set no limitation thereto.

For a carrier aggregation system (which includes multiple member carriers, that is, a carrier 1 and a carrier 2 mentioned hereinafter) between base stations, a first base station and a second base station perform downlink data scheduling on the UE separately by using their respective downlink carriers (that is, send HARQ process data to the UE in corresponding downlink carriers), where a downlink carrier of the first base station is the carrier 1, and a downlink carrier of the second base station is the carrier 2. If the two base stations are connected in a non ideal reverberation manner, the first base station only knows a mapping relationship between a data process scheduling status and an HARQ-ACK information transmission resource that are in the carrier 1, but does not know a data process scheduling status and an HARQ-ACK information transmission resource that are in the carrier 2. The first base station cannot learn, by receiving an uplink signal of the UE, HARQ-ACK information that is sent by the second base station and that corresponds to a data process, and also cannot send, to the second base station, HARQ-ACK information corresponding to the carrier 2. To avoid the foregoing problems, the UE may send HARQ-ACK information to multiple base stations in a time division manner, that is, HARQ-ACK information corresponding to HARQ process data of different carriers is sent to a corresponding base station at different time. However, that the foregoing UE sends the HARQ-ACK information at different time brings a problem that scheduling by the base station for the UE is limited, that is, at some moments, the base station is limited to using a carrier in the member carriers to perform downlink data scheduling on the UE, so that the UE cannot work in multiple downlink carriers at the same time, and a frequency spectrum resource of the carrier aggregation system cannot be fully used. A simple example is used for illustration herein: It is assumed that the first base station sends HARQ-ACK process data in the carrier 1 at an $N^{th}$ moment. A time sequence relationship between a sending moment when a data transmit end sends a piece of HARQ process data and a moment when the data transmit end receives an HARQ-ACK feedback of the process data is preset in the prior art, that is, HARQ-ACK information that is of the HARQ process data and sent by the UE should be received at an $N+K^{th}$ moment. However, at the $N+K^{th}$ moment, the UE sends, to the second base station in an uplink carrier of the second base station, HARQ-ACK information corresponding to HARQ process data in the carrier 2. Therefore, no positive HARQ-ACK information can be obtained for downlink data scheduling performed on the UE in the carrier 1 by the first base station at the $N^{th}$ moment, which becomes invalid transmission.

To resolve the foregoing problem that scheduling by the base station for the UE is limited, the embodiments of the present invention provide the following methods.

FIG. 1 is a schematic flowchart of a data transmission method according to Embodiment 1 of the present invention. This embodiment of the present invention is executed by a data receive end. As shown in FIG. 1, the method includes:

S101: Receive a $P^{th}$ piece of HARQ process data sent by a data transmit end at an $N^{th}$ moment, where P is a positive integer greater than or equal to 1, and N is a positive integer greater than or equal to 1.

Specifically, the data transmit end sends the $P^{th}$ piece of HARQ process data to the data receive end at the $N^{th}$ moment, and the data transmit end also sends P-1 pieces of HARQ process data to the data receive end at a moment prior to the $N^{th}$ moment, where P is the positive integer greater than or equal to 1, and N is the positive integer greater than or equal to 1. It should be noted that for HARQ-ACK information corresponding to the P-1 pieces of HARQ process data, there may be the following three cases:

A first case: The data receive end feeds back, to the data transmit end, HARQ-ACK information corresponding to some HARQ process data in the P-1 pieces of HARQ process data;

a second case: The data receive end feeds back, to the data transmit end, all HARQ-ACK information corresponding to the P-1 pieces of HARQ process data; and a third case: The data receive end does not feed back, to the data transmit end, any HARQ-ACK information corresponding to the P-1 pieces of HARQ process data.

S102: Send, to the data transmit end at an $M^{th}$ moment, HARQ-ACK information corresponding to Q pieces of HARQ process data, where the HARQ-ACK information corresponding to the Q pieces of HARQ process data is a feedback corresponding to HARQ process data whose HARQ-ACK information is not sent to the data transmit end before the $M^{th}$ moment, the foregoing HARQ-ACK information corresponding to the Q pieces of HARQ process data includes a $P^{th}$ piece of HARQ-ACK information corresponding to the $P^{th}$ piece of HARQ process data, and M is a positive integer greater than N.

Specifically, after receiving the $P^{th}$ piece of HARQ process data sent by the data transmit end, the data receive end performs processing such as demodulation and decoding on the $P^{th}$ piece of HARQ process data and determines whether the $P^{th}$ piece of HARQ process data is properly received. In addition, Q pieces of HARQ-ACK information are sent to the data transmit end at the $M^{th}$ moment, where the HARQ-ACK information corresponding to the Q pieces of HARQ process data is the feedback corresponding to the HARQ process data whose HARQ-ACK information is not sent by the data receive end to the data transmit end before the $M^{th}$ moment. It should be noted that the HARQ-ACK information corresponding to the foregoing Q pieces of HARQ process data may be a feedback corresponding to all HARQ process data (Q pieces of HARQ process data) whose HARQ-ACK information is not sent by the data receive end to the data transmit end before the $M^{th}$ moment, or may be a feedback corresponding to some HARQ process data (a quantity of the some HARQ process data herein is greater than 1) whose HARQ-ACK information is not sent by the data receive end to the data transmit end before the $M^{th}$ moment. In addition, the foregoing HARQ-ACK information corresponding to the $P^{th}$ piece of HARQ process data is also included in the foregoing Q pieces of HARQ-ACK information. To understand a technical solution with reference to the HARQ-ACK information corresponding to the P-1 pieces of HARQ process data described in this embodiment, the HARQ-ACK information corresponding to the Q pieces of HARQ process data may be HARQ-ACK information that is fed back by the foregoing data receive end to the data transmit end and that corresponds to some HARQ process data in the P-1 pieces of HARQ process data, or may be all HARQ-ACK information that is fed back by the data receive end to the data transmit end and that corresponds to the P-1 pieces of HARQ process data.

That is, the data receive end sends, to the data transmit end, all HARQ-ACK information corresponding to the HARQ process data whose HARQ-ACK information is not sent to the data transmit end before the $M^{th}$ moment. Therefore, when not receiving the HARQ-ACK information corresponding to the HARQ process data, the data transmit end may further continue to perform, in a corresponding carrier, detection on HARQ-ACK information corresponding to these HARQ process data, that is, scheduling of these HARQ process data by the data transmit end is still valid.

According to the data transmission method provided in this embodiment of the present invention, a data receive end receives a $P^{th}$ piece of HARQ process data sent by a data transmit end at an $N^{th}$ moment, the data receive end sends, at an $M^{th}$ moment, HARQ-ACK information corresponding to Q pieces of HARQ process data that includes a $P^{th}$ piece of HARQ-ACK information corresponding to the $P^{th}$ piece of HARQ process data, and the HARQ-ACK information corresponding to the Q pieces of HARQ processes data is a feedback corresponding to some or all HARQ process data in HARQ process data whose HARQ-ACK information is not fed back to the data transmit end before the foregoing $M^{th}$ moment, so that HARQ process data that is sent by the data transmit end to the data receive end in multiple downlink carriers at the same time is valid. Therefore, a frequency spectrum resource of a carrier aggregation system can be fully used, which improves a peak transmission rate of a user.

Further, on the basis of the foregoing embodiment shown in FIG. 1, as a feasible implementation manner of this embodiment of the present invention, the method provided in this embodiment relates to a process in which the data transmit end configures a corresponding HARQ-ACK information transmission resource for the data receive end. Optionally, after S101 and before S102, the foregoing method further includes: receiving an HARQ-ACK information transmission resource set configured by the data transmit end for all HARQ process data, where each piece of HARQ process data corresponds to one HARQ-ACK information transmission resource.

Specifically, the data transmit end configures corresponding HARQ-ACK information transmission resources for all the HARQ process data that the data transmit end needs to send, so as to constitute an HARQ-ACK information transmission resource set, where one piece of HARQ process data corresponds to one specific HARQ-ACK information transmission resource, and HARQ-ACK information corresponding to the piece of HARQ process data is transmitted on the corresponding specific HARQ-ACK information transmission resource. Optionally, the data transmit end may send, to the data receive end by using high layer signaling, information used to indicate the foregoing HARQ-ACK information transmission resource set, or may send, to the data receive end in another manner, the foregoing information used to indicate the HARQ-ACK information transmission resource set, which is not limited in this embodiment of the present invention. The foregoing one specific HARQ-ACK information transmission resource refers to an HARQ-ACK information transmission resource required for sending the HARQ-ACK information corresponding to the HARQ process data. A transmission resource size of the foregoing HARQ-ACK information may vary with different transmission manners or the like of the process data.

The data receive end receives the HARQ-ACK information transmission resources that are configured for all the HARQ process data by the data transmit end, and may feed back Q pieces of HARQ-ACK information in the following manner. It should be noted that the following manner is only a possible manner in which the HARQ-ACK information corresponding to the Q pieces of HARQ process data is fed back at the $M^{th}$ moment, and an actual implementation manner is not limited to the following manner: In an LTE system, a form similar to a physical uplink control channel format 3 (Physical Uplink Control Channel format 3, PUCCH format 3 for short hereinafter) may be used, where the PUCCH format 3 supports 48 coded bits. In addition, a similar format may further be used to define a PUCCH format 4. In a format of the PUCCH format 4, some or all bits in the 48 bits are used to configure a specific HARQ-ACK information transmission resource for each piece of HARQ process data in all the HARQ process data of the data receive end, and the specific HARQ-ACK information transmission resource configured for each piece of HARQ process data may transmit three states of the HARQ-ACK information: ACK, NACK, and discontinuous transmission (Discontinuous Transmission, DTX for short hereinafter). For the data transmit end, the DTX state of the HARQ-ACK information is equivalent to that the HARQ-ACK information is not detected. A resource in which the PUCCH format 4 is located may also be indicated by the data transmit end to the data receive end. When the data receive end receives the $P^{th}$ piece of HARQ process data sent by the data transmit end, the UE selects, from the foregoing HARQ-ACK information transmission resource set, corresponding Q specific HARQ-ACK information transmission resources corresponding to Q pieces of HARQ process data, carries, on these Q specific HARQ-ACK information transmission resources, HARQ-ACK information of the foregoing determined Q pieces of HARQ process data and sends the HARQ-ACK information to the transmit end, and sends a DTX state message to the transmit end on another resource except the Q specific HARQ-ACK information transmission resources in the specific HARQ-ACK information transmission resources corresponding to all the HARQ process data. Optionally, the Q HARQ-ACK information transmission resources include wireless resources such as time, a frequency, a code domain, and a space domain.

Further, on the basis of the foregoing embodiment, the $P^{th}$ piece of HARQ process data corresponds to a $P^{th}$ HARQ-ACK information detection window, and the $P^{th}$ HARQ-ACK information detection window is a time length used by the foregoing data transmit end to perform detection on a $P^{th}$ piece of HARQ-ACK information; then, sending, to the data transmit end at the $M^{th}$ moment, the HARQ-ACK information corresponding to the Q pieces of HARQ process data includes: sending, to the data transmit end, the HARQ-ACK information corresponding to the Q pieces of HARQ process data within sending time corresponding to the $P^{th}$ HARQ-ACK information detection window, where the foregoing $M^{th}$ moment is a preset sending moment within the sending time corresponding to the $P^{th}$ HARQ-ACK information detection window.

Specifically, in this embodiment of the present invention, the $P^{th}$ piece of HARQ process data corresponds to the $P^{th}$ HARQ-ACK information detection window, where the $P^{th}$ HARQ-ACK information detection window is the time length during which the data transmit end performs detection on the $P^{th}$ piece of HARQ-ACK information (the time length is a time range), that is, the $P^{th}$ HARQ-ACK information detection window is defined in terms of time during which the data transmit end performs detection on the $P^{th}$ piece of HARQ-ACK information, and the $P^{th}$ HARQ-ACK information detection window corresponds to a detection time period of the data transmit end. On the other hand, the sending time corresponding to the $P^{th}$ HARQ-ACK information detection window is sending time defined in terms of the data receive end, that is, the $P^{th}$ piece of HARQ-ACK information sent by the data receive end within the sending time reaches the data transmit end, and the data transmit end may detect the $P^{th}$ piece of HARQ-ACK information in the $P^{th}$ HARQ-ACK information detection window. In other words, a moment within the foregoing sending time for sending the $P^{th}$ piece of HARQ-ACK information plus transmission time during which the $P^{th}$ piece of HARQ-ACK information reaches the data transmit end falls within the $P^{th}$ HARQ-ACK information detection window of the data transmit end. Therefore, sending, by the data receive end, the Q pieces of HARQ-ACK information to the data transmit end on the Q HARQ-ACK information transmission resources is performed within a sending time period of the data receive end corresponding to a time period of the $P^{th}$ HARQ-ACK information detection window. The $M^{th}$ moment when the foregoing data receive end sends the HARQ-ACK information corresponding to the Q pieces of HARQ process data is a fixed moment within the foregoing sending time, and the fixed moment may be a sending moment stipulated by the data transmit end and the data receive end.

In addition, it should be noted that a start moment of the $P^{th}$ HARQ-ACK information detection window is a moment when the foregoing data transmit end starts to perform detection on the $P^{th}$ piece of HARQ-ACK information.

Figure 2:
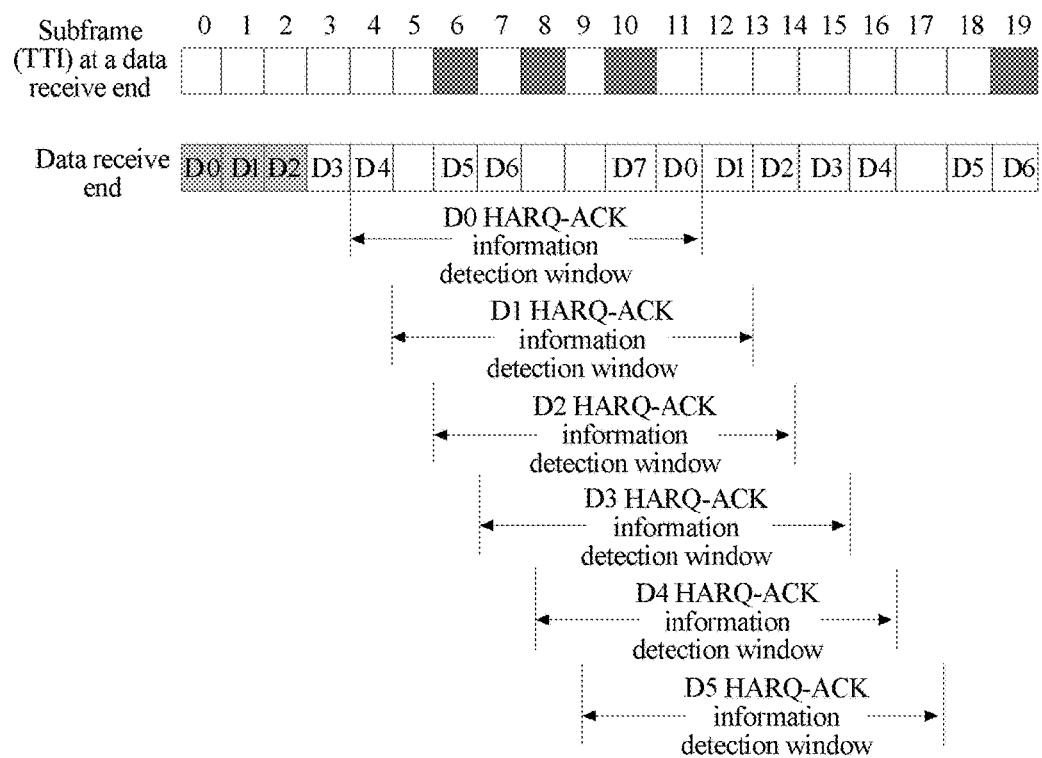
FIG. 2 is a schematic application diagram of a data transmission method according to the present invention.

To better understand the method in this embodiment of the present invention, content shown in FIG. 2 is used as an example for detailed illustration herein, and reference is made to FIG. 2.

Specifically, a schematic wireless subframe in FIG. 2 includes 20 transmission time intervals (Transmission Time Interval, TTI for short hereinafter). Optionally, there are eight pieces of HARQ process data D0-D7 that are of a data transmit end and that are scheduled by the data transmit end at different TTIs, that is, the data transmit end sends the HARQ process data D0-D7 to a data receive end at the different TTIs. The data receive end sends HARQ-ACK information to the data transmit end only at a $6^{th}$ TTI, an $8^{th}$ TTI, a $10^{th}$ TTI, and a $19^{th}$ TTI. Particularly, a moment when the data receive end may send the HARQ-ACK information to the data transmit end is a time resource pre-stipulated by the data transmit end and the data receive end. The foregoing $M^{th}$ moment is the $6^{th}$ TTI, and a length of an HARQ-ACK information detection window of each piece of HARQ process data of the data transmit end is preferentially eight TTIs, which is not limited in the present invention.

Referring to FIG. 2, that the eight pieces of HARQ process data of the data transmit end are scheduled at the different TTIs is specifically: D0 is scheduled at a $0^{th}$ TTI, D1 is scheduled at a $1^{st}$ TTI, D2 is scheduled at a $2^{nd}$ TTI, D3 is scheduled at a $3^{rd}$ TTI, D4 is scheduled at a $4^{th}$ TTI, D5 is scheduled at the $6^{th}$ TTI, D6 is scheduled at a $7^{th}$ TTI, D7 is scheduled at a $10^{th}$ TTI, D0 is scheduled at an $11^{th}$ TTI, and the like. The data receive end may send the HARQ-ACK information to the data transmit end only at the $6^{th}$ TTI, the $8^{th}$ TTI, the $10^{th}$ TTI, and the $19^{th}$ TTI. It is assumed that the data transmit end schedules D0 at the $0^{th}$ TTI, and the data receive end does not send, to the data transmit end, HARQ-ACK information corresponding to D0 after three TTIs, that is, at the $4^{th}$ TTI. In addition, it is assumed that the data transmit end schedules D1 at the $1^{st}$ TTI, and the data receive end also does not send, to the data transmit end, HARQ-ACK information corresponding to D1 after three TTIs, that is, at the $5^{th}$ TTI. However, the data transmit end schedules D2 at the $2^{nd}$ TTI, and the data receive end sends, to the data transmit end, HARQ-ACK information corresponding to D2 after three TTIs, that is, at the $6^{th}$ TTI, and sends, to the data transmit end at the same time, the foregoing HARQ-ACK information corresponding to D0 and D1. The HARQ-ACK information corresponding to D0, D1, and D2 herein is previously mentioned HARQ-ACK information corresponding to Q pieces of HARQ process data.

After the data receive end sends the HARQ-ACK information, the data transmit end performs, in an HARQ-ACK information detection window corresponding to each process, detection on HARQ-ACK information corresponding to each process. In this case, it should be noted that for D0 and D1 of the data transmit end, although the HARQ-ACK information corresponding to D0 and D1 is not received at corresponding moments (a receiving moment of the HARQ-ACK information corresponding to D0 is the $4^{th}$ TTI, and a receiving moment of the HARQ-ACK information corresponding to D1 is the $5^{th}$ TTI), this embodiment of the present invention introduces the foregoing HARQ-ACK information detection window. That is, the data transmit end may continue to separately perform detection on the HARQ-ACK information of D0 and D1 within HARQ-ACK information detection windows corresponding to D0 and D1, that is, detection time changes from a moment to a time length. The $6^{th}$ TTI at which the HARQ-ACK information corresponding to D0, D1, and D2 is sent is within HARQ-ACK information detection windows corresponding to D0, D1, and D2, and therefore the data transmit end may detect the foregoing HARQ-ACK information corresponding to D0, D1, and D2. When the data receive end feeds back HARQ-ACK information of a $P^{th}$ piece of HARQ process data, the HARQ-ACK information needs to be enabled to reach the data transmit end within an HARQ-ACK information detection window of the Pth piece of HARQ process data. Otherwise, the data receive end does not feed back the HARQ-ACK information of the $P^{th}$ piece of HARQ process data. For example, in FIG. 2, although the data receive end may send HARQ-ACK information at the $19^{th}$ TTI, for D6, the data receive end may foresee that an HARQ-ACK information detection window of D6 is exceeded when HARQ-ACK information of D6 reaches the data transmit end. Therefore, the data receive end does not send the HARQ-ACK information corresponding to D6 at the $19^{th}$ TTI.

It should be noted that a start moment of an HARQ information detection window of the $P^{th}$ piece of HARQ-ACK process data is an earliest moment when the data receive end finally sends, to the data transmit end, the HARQ-ACK information corresponding to the HARQ process data, after transmission time during which the $P^{th}$ piece of HARQ process data sent by the data transmit end reaches the data receive end and time during which the data receive end processes the HARQ process data. For example, as described above, after the data transmit end sends D2, a moment after time of three TTIs (that is, the $6^{th}$ TTI) is the start moment of the HARQ-ACK information detection window, where the time of the three TTIs is the transmission time during which the HARQ process data sent by the data transmit end reaches the data receive end, the time during which the data receive end processes the HARQ process data, and time required by the data receive end to send, to the data transmit end, the HARQ-ACK information corresponding to the HARQ process data.

According to the data transmission method provided in this embodiment of the present invention, a data receive end receives a $P^{th}$ piece of HARQ process data sent by a data transmit end at an $N^{th}$ moment, the data receive end sends, at an $M^{th}$ moment, HARQ-ACK information corresponding to Q pieces of HARQ process data that includes a $P^{th}$ piece of HARQ-ACK information corresponding to the $P^{th}$ piece of HARQ process data, and the HARQ-ACK information corresponding to the Q pieces of HARQ process data is a feedback corresponding to some or all HARQ process data in HARQ process data whose HARQ-ACK information is not fed back to the data transmit end before the foregoing $M^{th}$ moment, so that HARQ process data that is sent by the data transmit end to the data receive end in multiple downlink carriers at the same time is valid. Therefore, a frequency spectrum resource of a carrier aggregation system can be fully used, which improves a peak transmission rate of a user.

Figure 3:
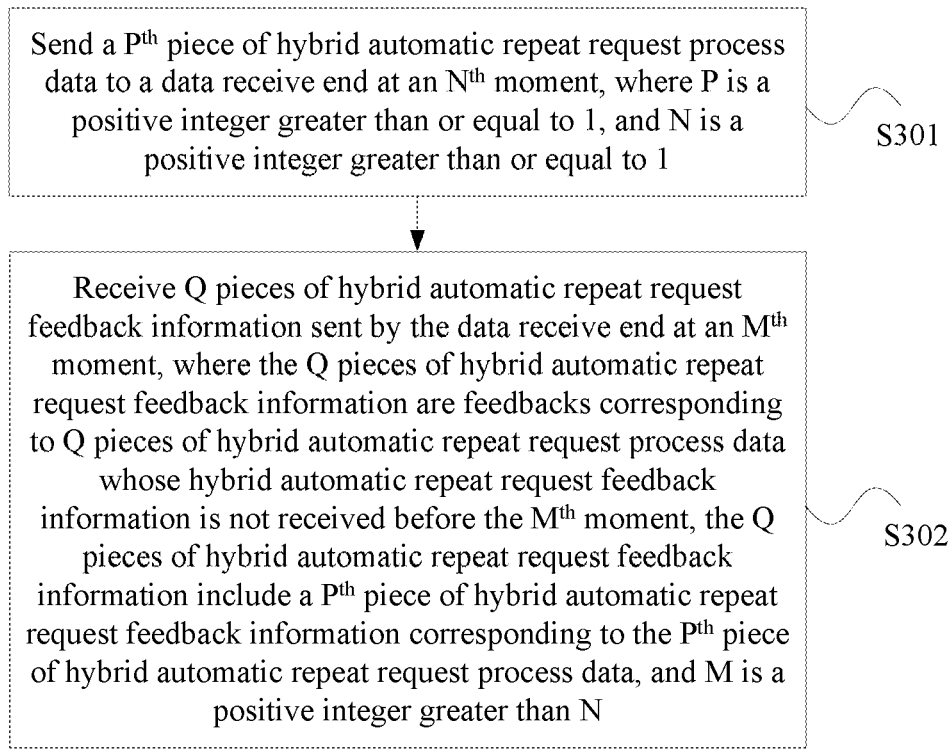
FIG. 3 is a schematic flowchart of a data transmission method according to Embodiment 2 of the present invention.

FIG. 3 is a schematic flowchart of a data transmission method according to Embodiment 2 of the present invention. This embodiment of present invention is executed by a data transmit end. As shown in FIG. 3, the method includes:

S301: Send a $P^{th}$ piece of HARQ process data to a data receive end at an $N^{th}$ moment, where P is a positive integer greater than or equal to 1, and N is a positive integer greater than or equal to 1.

Specifically, the data transmit end sends the $P^{th}$ piece of HARQ process data to the data receive end at the $N^{th}$ moment, and the data transmit end also sends P-1 pieces of HARQ process data to the data receive end at a moment prior to the $N^{th}$ moment, where P is the positive integer greater than or equal to 1, and N is the positive integer greater than or equal to 1.

S302: Receive HARQ-ACK information that is sent by the data receive end at an $M^{th}$ moment and that corresponds to Q pieces of HARQ process data, where the HARQ-ACK information corresponding to the Q pieces of HARQ process data is an HARQ-ACK feedback corresponding to HARQ process data whose HARQ-ACK information is not sent by the data receive end to the data transmit end before the $M^{th}$ moment, the Q pieces of HARQ-ACK information include a $P^{th}$ piece of HARQ-ACK information corresponding to the $P^{th}$ piece of HARQ process data, and M is a positive integer greater than N.

Specifically, after receiving the $P^{th}$ piece of HARQ process data sent by the data transmit end, the data receive end performs processing such as demodulation and decoding on the $P^{th}$ piece of HARQ process data and determines whether the $P^{th}$ piece of HARQ process data is properly received. In addition, the HARQ-ACK information corresponding to the Q pieces of HARQ process data is sent to the data transmit end at the $M^{th}$ moment, where the HARQ-ACK information corresponding to the Q pieces of HARQ process data is the feedback corresponding to the HARQ process data whose HARQ-ACK information is not sent by the data receive end to the data transmit end before the $M^{th}$ moment. It should be noted that the HARQ-ACK information corresponding to the foregoing Q pieces of HARQ process data may be a feedback corresponding to all HARQ process data (Q pieces of HARQ process data) whose HARQ-ACK information is not sent by the data receive end to the data transmit end before the $M^{th}$ moment, or may be a feedback corresponding to some HARQ process data (a quantity of the some HARQ process data is greater than or equal to 1) whose HARQ-ACK information is not sent by the data receive end to the data transmit end before the $M^{th}$ moment. In addition, the foregoing HARQ-ACK information corresponding to the $P^{th}$ piece of HARQ process data is also included in the foregoing Q pieces of HARQ-ACK information. That is, the data receive end sends, to the data transmit end, all HARQ-ACK information corresponding to the HARQ process data whose HARQ-ACK information is not sent to the data transmit end before the $M^{th}$ moment. Therefore, when not receiving the HARQ-ACK information corresponding to the HARQ process data, the data transmit end may further continue to perform, in a corresponding carrier, detection on HARQ-ACK information of these HARQ process data, that is, scheduling of these HARQ process data by the data transmit end is still valid.

According to the data transmission method provided in this embodiment of the present invention, a data receive end receives a $P^{th}$ piece of HARQ process data sent by a data transmit end at an $N^{th}$ moment, the data receive end sends, at an $M^{th}$ moment, HARQ-ACK information corresponding to Q pieces of HARQ process data that includes a $P^{th}$ piece of HARQ-ACK information, and the HARQ-ACK information corresponding to the Q pieces of HARQ process data is an HARQ-ACK feedback corresponding to the HARQ process data whose HARQ-ACK information is not sent by the data receive end to the data transmit end before the foregoing $M^{th}$ moment, so that HARQ process data that is sent by the data transmit end to the data receive end in multiple downlink carriers at the same time is valid. Therefore, a frequency spectrum resource of a carrier aggregation system can be fully used, which improves a peak transmission rate of a user.

Further, on the basis of the foregoing embodiment shown in FIG. 3, as a feasible implementation manner of this embodiment of the present invention, the method provided in this embodiment relates to a process in which the data transmit end configures a corresponding HARQ-ACK information transmission resource for the data receive end. Optionally, after S301 and before S302, the foregoing method further includes: configuring, for the foregoing data receive end, an HARQ-ACK information transmission resource set corresponding to all HARQ process data, where each piece of HARQ process data corresponds to one HARQ-ACK information transmission resource; and sending, to the data receive end, information used to indicate the foregoing HARQ-ACK information transmission resource set.

Specifically, the data transmit end configures corresponding HARQ-ACK information transmission resources for all the HARQ process data that the data transmit end needs to send, so as to constitute an HARQ-ACK information transmission resource set, and sends, to the foregoing data receive end, information used to indicate the HARQ-ACK information transmission resource set. Optionally, the data transmit end may send, to the data receive end by using high layer signaling, the information used to indicate the foregoing HARQ-ACK information transmission resource set, or may send, to the data receive end in another manner, the foregoing information used to indicate the HARQ-ACK information transmission resource set, which is not limited in this embodiment of the present invention. One HARQ- ACK information transmission resource refers to an HARQ-ACK information transmission resource required for sending the HARQ-ACK information corresponding to the HARQ process data. A transmission resource size of the foregoing HARQ-ACK information may vary with different transmission manners or the like of the process data. HARQ-ACK information of one piece of HARQ process data is transmitted on a specific HARQ-ACK information transmission resource corresponding to the HARQ process data.

Therefore, when the data receive end receives the HARQ-ACK information transmission resource set configured by the data transmit end, and when the data receive end receives the $P^{th}$ piece of HARQ process data sent by the data transmit end, UE selects, from the foregoing HARQ-ACK information transmission resource set, corresponding Q specific HARQ-ACK information transmission resources corresponding to Q pieces of HARQ process data, carries, on the foregoing determined Q specific HARQ-ACK information transmission resources, the foregoing HARQ-ACK information corresponding to the HARQ process data whose HARQ-ACK information is not fed back to the data transmit end, and sends the HARQ-ACK information to the data transmit end at the $M^{th}$ moment. The data transmit end receives the Q pieces of HARQ-ACK information that are sent by the foregoing data receive end at the $M^{th}$ moment and on the Q HARQ-ACK information transmission resources corresponding to the foregoing Q pieces of HARQ process data. Optionally, the Q HARQ-ACK information transmission resources include wireless resources such as time, a frequency, a code domain, and a space domain. In an LTE system, a form similar to a PUCCH format 3 may be used, where the PUCCH format 3 supports 48 coded bits. A similar format may further be used to define a PUCCH format 4. In a format of the PUCCH format 4, some or all bits in the 48 bits are used to configure, for the data receive end, specific HARQ-ACK information transmission resources corresponding to all the HARQ process data. A time-frequency resource in which the PUCCH format 4 is located may also be indicated by the data transmit end to the data receive end.

Further, on the basis of the foregoing embodiment, as another feasible implementation manner of this embodiment of the present invention, the method in this embodiment relates to a process in which the data transmit end performs detection on a $P^{th}$ piece of HARQ-ACK information in an HARQ-ACK information detection window corresponding to the $P^{th}$ piece of HARQ process data. Optionally, after S302, the method further includes: performing detection on a $P^{th}$ piece of HARQ-ACK information corresponding to the $P^{th}$ piece of HARQ process data within an HARQ-ACK information detection window corresponding to the $P^{th}$ piece of HARQ process data.

Specifically, the data transmit end receives the Q pieces of HARQ-ACK information that are sent by the data receive end at the $M^{th}$ moment and that correspond to the Q pieces of HARQ process data, and the $P^{th}$ piece of HARQ-ACK information corresponding to the $P^{th}$ piece of HARQ process data is also included. That the data transmit end performs detection on the $P^{th}$ piece of HARQ-ACK information in the $P^{th}$ HARQ-ACK information detection window is specifically: if the $P^{th}$ piece of HARQ-ACK information corresponding to the $P^{th}$ piece of HARQ process data is detected, determining an acknowledgement message of the $P^{th}$ piece of HARQ process data according to an indication of the $P^{th}$ piece of HARQ-ACK information (that is, determining that the $P^{th}$ piece of HARQ process data is successfully sent); or if the $P^{th}$ piece of HARQ-ACK information corresponding to the $P^{th}$ piece of HARQ process data is not detected, determining that the $P^{th}$ piece of HARQ process data fails to be sent. In addition, in HARQ-ACK information detection windows respectively corresponding to the P-1 pieces of HARQ process data that are sent by the data transmit end before the $N^{th}$ moment, it is also detected that P-1 pieces of HARQ-ACK information corresponding to the P-1 pieces of HARQ process data are received.

Herein, there is a case in which the data transmit end possibly receives HARQ-ACK information corresponding to some HARQ process data in the P-1 pieces of HARQ process data. Therefore, in a subsequent detection process, detection is performed only in an HARQ-ACK information detection window corresponding to HARQ process data whose HARQ-ACK information is not received.

It should be noted that the $P^{th}$ piece of HARQ process data corresponds to the $P^{th}$ HARQ-ACK information detection window, where the $P^{th}$ HARQ-ACK information detection window is a time length during which the data transmit end performs detection on the $P^{th}$ piece of HARQ-ACK information (the time length is a time range). That is, in this embodiment of the present invention, time when the data transmit end performs detection on the HARQ-ACK information changes from an original moment to a time period. As long as the data transmit end detects, within the time period, a feedback (that is, the HARQ-ACK information) corresponding to the HARQ process data whose HARQ-ACK information is not received, the data transmit end does not limit downlink data scheduling of the data receive end.

In addition, a start moment of the $P^{th}$ HARQ-ACK information detection window is a moment when the foregoing data transmit end starts to perform detection on the $P^{th}$ piece of HARQ-ACK information.

According to the data transmission method provided in this embodiment of the present invention, a data receive end receives a $P^{th}$ piece of HARQ process data sent by a data transmit end at an $N^{th}$ moment, the data receive end sends, at an $M^{th}$ moment, HARQ-ACK information corresponding to Q pieces of HARQ process data that includes a $P^{th}$ piece of HARQ-ACK information, and the HARQ-ACK information corresponding to the Q pieces of HARQ process data is an HARQ-ACK feedback corresponding to the HARQ process data whose HARQ-ACK information is not sent by the data receive end to the data transmit end before the foregoing $M^{th}$ moment, so that HARQ process data that is sent by the data transmit end to the data receive end in multiple downlink carriers at the same time is valid. Therefore, a frequency spectrum resource of a carrier aggregation system can be fully used, which improves a peak transmission rate of a user.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that may store program code, such as a ROM, a RAM, a magnetic disk, or an optical disc.

Figure 4:
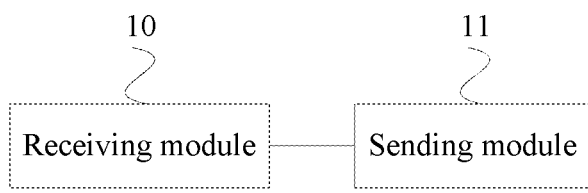
FIG. 4 is a schematic structural diagram of a data transmission apparatus according to Embodiment 1 of the present invention.

FIG. 4 is a schematic structural diagram of a data transmission apparatus according to Embodiment 1 of the present invention. As shown in FIG. 4, the apparatus includes: a receiving module 10, configured to receive a $P^{th}$ piece of HARQ process data sent by a data transmit end at an $N^{th}$ moment, where P is a positive integer greater than or equal to 1, and N is a positive integer greater than or equal to 1; and a sending module 11, configured to send, to the data transmit end at an $M^{th}$ moment, HARQ-ACK information corresponding to Q pieces of HARQ process data, where the foregoing HARQ-ACK information corresponding to the Q pieces of HARQ process data is a feedback corresponding to HARQ process data whose HARQ-ACK information is not sent to the data transmit end before the $M^{th}$ moment, the foregoing HARQ-ACK information corresponding to the Q pieces of HARQ process data includes a $P^{th}$ piece of HARQ-ACK information corresponding to the $P^{th}$ piece of HARQ process data, and M is a positive integer greater than N.

The data transmission apparatus provided in this embodiment of the present invention may execute the foregoing method embodiment Implementation principles and technical effects of the apparatus are similar, and details are not described herein again.

On the basis of the embodiment shown in FIG. 4, further, the foregoing receiving module 10 is further configured to: before the sending module 11 sends the HARQ-ACK information corresponding to the Q pieces of HARQ process data to the data transmit end at the $M^{th}$ moment, receive an HARQ-ACK information transmission resource set configured by the data transmit end for all HARQ process data, where each piece of HARQ process data corresponds to one HARQ-ACK information transmission resource; the sending module 11 is specifically configured to send, to the data transmit end, the HARQ-ACK information corresponding to the Q pieces of HARQ process data at the $M^{th}$ moment and on Q HARQ-ACK information transmission resources corresponding to the Q pieces of HARQ process data.

The data transmission apparatus provided in this embodiment of the present invention may execute the foregoing method embodiment Implementation principles and technical effects of the apparatus are similar, and details are not described herein again.

Further, on the basis of the embodiment shown in FIG. 4, the $P^{th}$ piece of HARQ process data corresponds to a $P^{th}$ HARQ-ACK information detection window, and the $P^{th}$ HARQ-ACK information detection window is a time length used by the data transmit end to detect whether the $P^{th}$ piece of HARQ-ACK information is received; the sending module 11 is specifically configured to send, to the data transmit end, the HARQ-ACK information corresponding to the Q pieces of HARQ process data within sending time corresponding to the $P^{th}$ HARQ-ACK information detection window, where the foregoing $M^{th}$ moment is a preset sending moment within the sending time corresponding to the $P^{th}$ HARQ-ACK information detection window.

Optionally, the foregoing $M^{th}$ moment may be indicated by the transmit end to the receive end.

It should be noted that a start moment of the $P^{th}$ HARQ-ACK information detection window is a start moment for performing detection on the $P^{th}$ piece of HARQ-ACK information.

The data transmission apparatus provided in this embodiment of the present invention may execute the foregoing method embodiment Implementation principles and technical effects of the apparatus are similar, and details are not described herein again.

Figure 5:
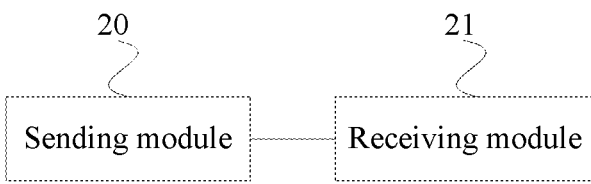
FIG. 5 is a schematic structural diagram of a data transmission apparatus according to Embodiment 2 of the present invention.

FIG. 5 is a schematic structural diagram of a data transmission apparatus according to Embodiment 2 of the present invention. As shown in FIG. 5, the apparatus includes: a sending module 20, configured to send a $P^{th}$ piece of HARQ process data to a data receive end at an $N^{th}$ moment, where P is a positive integer greater than or equal to 1, and N is a positive integer greater than or equal to 1; and a receiving module 21, configured to receive HARQ-ACK information that is sent by the data receive end at an $M^{th}$ moment and that corresponds to Q pieces of HARQ process data, where the HARQ-ACK information corresponding to the foregoing Q pieces of HARQ process data is an HARQ-ACK feedback corresponding to HARQ process data whose HARQ-ACK information is not sent by the data receive end to a data transmit end before the $M^{th}$ moment, the HARQ-ACK information corresponding to the foregoing Q pieces of HARQ process data includes a $P^{th}$ piece of HARQ-ACK information corresponding to the $P^{th}$ piece of HARQ process data, and M is a positive integer greater than N.

The data transmission apparatus provided in this embodiment of the present invention may execute the foregoing method embodiment Implementation principles and technical effects of the apparatus are similar, and details are not described herein again.

Figure 6:
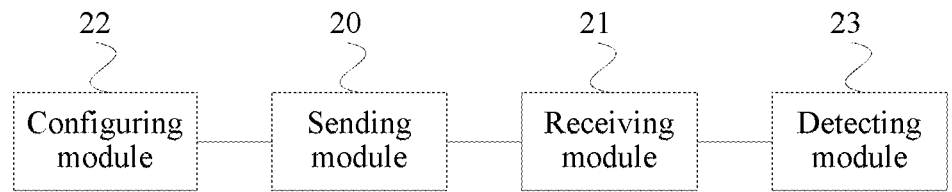
FIG. 6 is a schematic structural diagram of a data transmission apparatus according to Embodiment 3 of the present invention.

FIG. 6 is a schematic structural diagram of a data transmission apparatus according to Embodiment 3 of the present invention. On the basis of the embodiment shown in FIG. 6, the apparatus further includes: a configuring module 22, configured to: before the foregoing receiving module 21 receives Q pieces of HARQ-ACK information sent by the data receive end at the $M^{th}$ moment, configure, for the data receive end, an HARQ-ACK information transmission resource set corresponding to all HARQ process data, where each piece of HARQ process data corresponds to one HARQ-ACK information transmission resource; the foregoing sending module 20 is further configured to send, to the data receive end, information used to indicate the HARQ-ACK information transmission resource set; and the receiving module 21 is specifically configured to receive the Q pieces of HARQ-ACK information that are sent by the data receive end at the $M^{th}$ moment and on Q HARQ-ACK information transmission resources corresponding to the foregoing Q pieces of HARQ process data and that correspond to the Q pieces of HARQ process data.

The data transmission apparatus provided in this embodiment of the present invention may execute the foregoing method embodiment Implementation principles and technical effects of the apparatus are similar, and details are not described herein again.

Further, on the basis of the embodiment shown in FIG. 6, the apparatus further includes: a detecting module 23, configured to: after the foregoing sending module 20 sends the $P^{th}$ piece of HARQ process data to the data receive end at the $N^{th}$ moment, perform detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data. The detecting module 23 is specifically configured to: if the $P^{th}$ piece of HARQ-ACK information corresponding to the $P^{th}$ piece of HARQ process data is detected, determine an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determine that the $P^{th}$ piece of HARQ process data fails to be sent.

It should be noted that a start moment of the $P^{th}$ HARQ-ACK information detection window is a start moment for performing detection on the $P^{th}$ piece of HARQ-ACK information.

The data transmission apparatus provided in this embodiment of the present invention may execute the foregoing method embodiment Implementation principles and technical effects of the apparatus are similar, and details are not described herein again.

Figure 7:
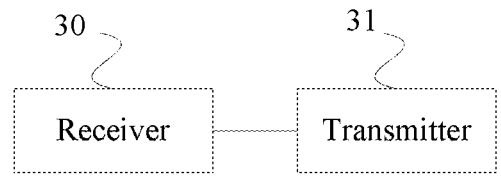
FIG. 7 is a schematic structural diagram of a data transmission device according to Embodiment 1 of the present invention.

FIG. 7 is a schematic structural diagram of a data transmission device according to Embodiment 1 of the present invention. As shown in FIG. 7, the device includes: a receiver 30, configured to receive a $P^{th}$ piece of HARQ process data sent by a data transmit end at an $N^{th}$ moment, where P is a positive integer greater than or equal to 1, and N is a positive integer greater than or equal to 1; and a transmitter 31, configured to send, to the data transmit end at an $M^{th}$ moment, HARQ-ACK information corresponding to Q pieces of HARQ process data, where the foregoing HARQ-ACK information corresponding to the Q pieces of HARQ process data is a feedback corresponding to HARQ process data whose HARQ-ACK information is not sent to the data transmit end before the $M^{th}$ moment, the foregoing HARQ-ACK information corresponding to the Q pieces of HARQ process data includes a $P^{th}$ piece of HARQ-ACK information corresponding to the $P^{th}$ piece of HARQ process data, and M is a positive integer greater than N.

The data transmission device provided in this embodiment of the present invention may execute the foregoing method embodiment Implementation principles and technical effects of the device are similar, and details are not described herein again.

Optionally, the foregoing receiver 30 is further configured to: before the transmitter 31 sends, to the data transmit end at the $M^{th}$ moment, the HARQ-ACK information corresponding to the Q pieces of HARQ process data, receive an HARQ-ACK information transmission resource set configured by the data transmit end for all HARQ process data, where each piece of HARQ process data corresponds to one HARQ-ACK information transmission resource; then, the transmitter 31 is specifically configured to send, to the data transmit end, the HARQ-ACK information corresponding to the Q pieces of HARQ process data at the $M^{th}$ moment and on Q HARQ-ACK information transmission resources corresponding to the Q pieces of HARQ process data.

Optionally, the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; then, the transmitter 31 is specifically configured to send, to the data transmit end, the HARQ-ACK information corresponding to the foregoing Q pieces of HARQ process data within sending time corresponding to the $P^{th}$ HARQ-ACK information detection window, where the foregoing $M^{th}$ moment is a preset sending moment within the sending time corresponding to the $P^{th}$ HARQ-ACK information detection window.

Optionally, the foregoing $M^{th}$ moment may be indicated by the transmit end to the receive end.

Optionally, a start moment of the $P^{th}$ HARQ-ACK information detection window is a moment when the data transmit end starts to perform detection on the $P^{th}$ piece of HARQ-ACK information.

The data transmission device provided in this embodiment of the present invention may execute the foregoing method embodiment Implementation principles and technical effects of the device are similar, and details are not described herein again.

Figure 8:
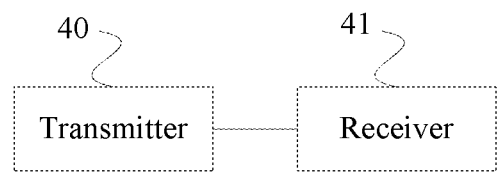
FIG. 8 is a schematic structural diagram of a data transmission device according to Embodiment 2 of the present invention.

FIG. 8 is a schematic structural diagram of a data transmission device according to Embodiment 2 of the present invention. As shown in FIG. 8, the device includes: a transmitter 40, configured to send a $P^{th}$ piece of HARQ process data to a data receive end at an $N^{th}$ moment, where P is a positive integer greater than or equal to 1, and N is a positive integer greater than or equal to 1; and a receiver 41, configured to receive HARQ-ACK information that is sent by the data receive end at an $M^{th}$ moment and that corresponds to Q pieces of HARQ process data, where the HARQ-ACK information corresponding to the foregoing Q pieces of HARQ process data is an HARQ-ACK feedback corresponding to HARQ process data whose HARQ-ACK information is not sent by the data receive end to a data transmit end before the $M^{th}$ moment, the HARQ-ACK information corresponding to the foregoing Q pieces of HARQ process data includes a $P^{th}$ piece of HARQ-ACK information corresponding to the $P^{th}$ piece of HARQ process data, and M is a positive integer greater than N.

The data transmission device provided in this embodiment of the present invention may execute the foregoing method embodiment Implementation principles and technical effects of the device are similar, and details are not described herein again.

Figure 9:
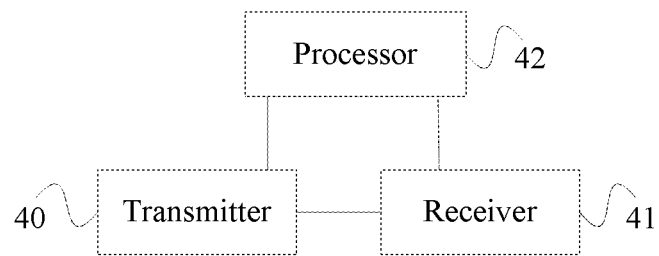
FIG. 9 is a schematic structural diagram of a data transmission device according to Embodiment 3 of the present invention.

FIG. 9 is a schematic structural diagram of a data transmission device according to Embodiment 3 of the present invention. On the basis of the embodiment shown in FIG. 8, the device further includes: a processor 42, configured to: before the receiver 41 receives the HARQ-ACK information that is sent by the data receive end at the $M^{th}$ moment and that corresponds to the Q pieces of HARQ process data, configure, for the data receive end, an HARQ-ACK information transmission resource set corresponding to all HARQ process data, where each piece of HARQ process data corresponds to one HARQ-ACK information transmission resource; the transmitter 40 is further configured to send, to the data receive end, information used to indicate the HARQ-ACK information transmission resource set; then, the receiver 41 is specifically configured to receive the Q pieces of HARQ-ACK information that are sent by the data receive end at the $M^{th}$ moment and on Q HARQ-ACK information transmission resources corresponding to the Q pieces of HARQ process data and that correspond to the Q pieces of HARQ process data.

The data transmission device provided in this embodiment of the present invention may execute the foregoing method embodiment Implementation principles and technical effects of the device are similar, and details are not described herein again.

Optionally, the processor 42 is further configured to: after the transmitter 40 sends the $P^{th}$ piece of HARQ process data to the data receive end at the $N^{th}$ moment, perform detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

Optionally, the processor 42 is specifically configured to: if the $P^{th}$ piece of HARQ-ACK information corresponding to the $P^h$ piece of HARQ process data is detected, determine an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determine that the $P^{th}$ piece of HARQ process data fails to be sent.

Optionally, a start moment of the $P^{th}$ HARQ-ACK information detection window is a start moment for performing detection on the $P^{th}$ piece of HARQ-ACK information.

The data transmission device provided in this embodiment of the present invention may execute the foregoing method embodiment Implementation principles and technical effects of the device are similar, and details are not described herein again.

Finally, it should be noted that the foregoing embodiments are merely intended for describing the technical solutions of the present invention, but not for limiting the present invention.

Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method being executed by instructions stored on a non-transitory computer readable medium, the method comprising:
   receiving a $P^{th}$ piece of hybrid automatic repeat request (HARQ) process data sent by a data transmit end at an $N^{th}$ moment, wherein P is a positive integer greater than or equal to 1, and N is a positive integer greater than or equal to 1; and
   sending, to the data transmit end at an $M^{th}$ moment, hybrid automatic repeat request-acknowledgment (HARQ-ACK) information corresponding to pieces of HARQ process data, wherein the HARQ-ACK information corresponding to the pieces of HARQ process data is a feedback corresponding to HARQ process data whose HARQ-ACK information is not sent to the data transmit end before the $M^{th}$ moment, the HARQ-ACK information corresponding to the pieces of HARQ process data comprises a $P^{th}$ piece of HARQ-ACK information corresponding to the $P^{th}$ piece of HARQ process data, and M is a positive integer greater than N.

2. The method according to claim 1, before the sending, to the data transmit end at an $M^{th}$ moment, HARQ-ACK information corresponding to pieces of HARQ process data, further comprising:
   receiving an HARQ-ACK information transmission resource set configured by the data transmit end for all HARQ process data, wherein each piece of HARQ process data corresponds to one HARQ-ACK information transmission resource; and
   the sending, to the data transmit end at an $M^{th}$ moment, HARQ-ACK information corresponding to pieces of HARQ process data comprises:
   sending, to the data transmit end, the HARQ-ACK information corresponding to the Q pieces of HARQ process data at the $M^{th}$ moment and on Q HARQ-ACK information transmission resources corresponding to the pieces of HARQ process data.

3. The method according to claim 1, wherein the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; the sending, to the data transmit end at an $M^{th}$ moment, HARQ-ACK information corresponding to the pieces of HARQ process data comprises:
   sending, to the data transmit end, the HARQ-ACK information corresponding to the pieces of HARQ process data within sending time corresponding to the $P^{th}$ HARQ-ACK information detection window, wherein the $M^{th}$ moment is a preset sending moment within the sending time corresponding to the $P^{th}$ HARQ-ACK information detection window.

4. The method according to claim 3, wherein a start moment of the $P^{th}$ HARQ-ACK information detection window is a moment when the data transmit end starts to perform detection on the $P^{th}$ piece of HARQ-ACK information.

5. A data transmission method being executed by instructions stored on a non-transitory computer readable medium, the method comprising:
   sending a $P^{th}$ piece of hybrid automatic repeat request (HARQ) process data to a data receive end at an $N^{th}$ moment, wherein P is a positive integer greater than or equal to 1, and N is a positive integer greater than or equal to 1; and
   receiving hybrid automatic repeat request-acknowledgment (HARQ-ACK) information that is sent by the data receive end at an $M^{th}$ moment and that corresponds to pieces of HARQ process data, wherein the HARQ-ACK information corresponding to the pieces of HARQ process data is an HARQ-ACK feedback corresponding to HARQ process data whose HARQ-ACK information is not sent by the data receive end to a data transmit end before the $M^{th}$ moment, the HARQ-ACK information corresponding to the pieces of HARQ process data comprises a $P^{th}$ piece of HARQ-ACK information corresponding to the $P^{th}$ piece of HARQ process data, and M is a positive integer greater than N.

6. The method according to claim 5, before the receiving HARQ-ACK information that is sent by the data receive end at an $M^{th}$ moment and that corresponds to pieces of HARQ process data, further comprising:
   configuring, for the data receive end, an HARQ-ACK information transmission resource set corresponding to all HARQ process data, wherein each piece of HARQ process data corresponds to one HARQ-ACK information transmission resource; and
   sending, to the data receive end, information used to indicate the HARQ-ACK information transmission resource set, wherein
   the receiving HARQ-ACK information that is sent by the data receive end at an $M^{th}$ moment and that corresponds to pieces of HARQ process data comprises:
   receiving pieces of HARQ-ACK information that are sent by the data receive end at the $M^{th}$ moment and on HARQ-ACK information transmission resources corresponding to the pieces of HARQ process data and that correspond to the pieces of HARQ process data.

7. The method according to claim 5, after the sending a $P^{th}$ piece of HARQ process data to a data receive end at an $N^{th}$ moment, further comprising:
   performing detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

8. The method according to claim 7, the performing detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data comprises:
   if the $P^{th}$ piece of HARQ-ACK information corresponding to the $P^{th}$ piece of HARQ process data is detected, determining an acknowledgement message of the $P^{th}$ piece of HARQ process data according to an indication of the $P^{th}$ piece of HARQ-ACK information; or
   if the $P^{th}$ piece of HARQ-ACK information corresponding to the $P^{th}$ piece of HARQ process data is not detected, determining that the $P^{th}$ piece of HARQ process data fails to be sent.

9. The method according to claim 8, wherein a start moment of the $P^{th}$ HARQ-ACK information detection window is a start moment for performing detection on the $P^{th}$ piece of HARQ-ACK information.

10. A data transmission device, comprising:
a receiver, configured to receive a $P^{th}$ piece of hybrid automatic repeat request (HARQ) process data sent by a data transmit end at an $N^{th}$ moment, wherein P is a positive integer greater than or equal to 1, and N is a positive integer greater than or equal to 1; and
a transmitter, configured to send, to the data transmit end at an $M^{th}$ moment, hybrid automatic repeat request-acknowledgment (HARQ-ACK) information corresponding to pieces of HARQ process data, wherein the HARQ-ACK information corresponding to the pieces of HARQ process data is a feedback corresponding to HARQ process data whose HARQ-ACK information is not sent to the data transmit end before the $M^{th}$ moment, the HARQ-ACK information corresponding to the pieces of HARQ process data comprises a $P^{th}$ piece of HARQ-ACK information corresponding to the $P^{th}$ piece of HARQ process data, and M is a positive integer greater than N.

11. The device according to claim 10, wherein the receiver is further configured to: before the transmitter sends, to the data transmit end at the $M^{th}$ moment, the HARQ-ACK information corresponding to the pieces of HARQ process data, receive an HARQ-ACK information transmission resource set configured by the data transmit end for all HARQ process data, wherein each piece of HARQ process data corresponds to one HARQ-ACK information transmission resource; and
the transmitter is specifically configured to send, to the data transmit end, the HARQ-ACK information corresponding to the pieces of HARQ process data at the $M^{th}$ moment and on HARQ-ACK information transmission resources corresponding to the pieces of HARQ process data.

12. The device according to claim 10, wherein the $P^{th}$ piece of HARQ process data corresponds to a $P^{th}$ HARQ-ACK information detection window, and the $P^{th}$ HARQ-ACK information detection window is a time length used by the data transmit end to perform detection on the $P^{th}$ piece of HARQ-ACK information; then, the transmitter is specifically configured to send, to the data transmit end, the HARQ-ACK information corresponding to the pieces of HARQ process data within sending time corresponding to the $P^{th}$ HARQ-ACK information detection window, wherein the $M^{th}$ moment is a preset sending moment within the sending time corresponding to the $P^{th}$ HARQ-ACK information detection window.

13. The device according to claim 12, wherein a start moment of the $P^{th}$ HARQ-ACK information detection window is a moment when the data transmit end starts to perform detection on the $P^{th}$ piece of HARQ-ACK information.

14. A data transmission device, comprising:
a transmitter, configured to send a $P^{th}$ piece of hybrid automatic repeat request (HARQ) process data to a data receive end at an $N^{th}$ moment, wherein P is a positive integer greater than or equal to 1, and N is a positive integer greater than or equal to 1; and
a receiver, configured to receive hybrid automatic repeat request-acknowledgment (HARQ-ACK) information that is sent by the data receive end at an $M^{th}$ moment and that corresponds to pieces of HARQ process data, wherein the HARQ-ACK information corresponding to the pieces of HARQ process data is an HARQ-ACK feedback corresponding to HARQ process data whose HARQ-ACK information is not sent by the data receive end to a data transmit end before the le moment, the HARQ-ACK information corresponding to the pieces of HARQ process data comprises a $P^{th}$ piece of HARQ-ACK information corresponding to the $P^{th}$ piece of HARQ process data, and M is a positive integer greater than N.

15. The device according to claim 14, wherein the device further comprises:
a processor, configured to: before the receiver receives the HARQ-ACK information that is sent by the data receive end at the $M^{th}$ moment and that corresponds to the pieces of HARQ process data, configure, for the data receive end, an HARQ-ACK information transmission resource set corresponding to all HARQ process data, wherein each piece of HARQ process data corresponds to one HARQ-ACK information transmission resource;
the transmitter is further configured to send, to the data receive end, information used to indicate the HARQ-ACK information transmission resource set; and
the receiver is specifically configured to receive pieces of HARQ-ACK information that are sent by the data receive end at the $M^{th}$ moment and on HARQ-ACK information transmission resources corresponding to the pieces of HARQ process data and that correspond to the pieces of HARQ process data.

16. The device according to claim 14, wherein the processor is further configured to: after the transmitter sends the $P^{th}$ piece of HARQ process data to the data receive end at the $N^{th}$ moment, perform detection on a $P^{th}$ piece of HARQ-ACK information corresponding to the $P^{th}$ piece of HARQ process data within a $P^{th}$ HARQ-ACK information detection window corresponding to the $P^{th}$ piece of HARQ process data.

17. The device according to claim 16, wherein the processor is specifically configured to: if the $P^{th}$ piece of HARQ-ACK information corresponding to the $P^{th}$ piece of HARQ process data is detected, determine an acknowledgement message of the $P^{th}$ piece of HARQ process data according to an indication of the $P^{th}$ piece of HARQ-ACK information; or if the $P^{th}$ piece of HARQ-ACK information corresponding to the $P^{th}$ piece of HARQ process data is not detected, determine that the $P^{th}$ piece of HARQ process data fails to be sent.

18. The device according to claim 17, wherein a start moment of the $P^{th}$ HARQ-ACK information detection window is a start moment for performing detection on the $P^{th}$ piece of HARQ-ACK information.

* * * * *